(12) United States Patent
Ekberg et al.

(10) Patent No.: US 7,548,913 B2
(45) Date of Patent: Jun. 16, 2009

(54) INFORMATION SYNTHESIS ENGINE

(75) Inventors: Christopher A. Ekberg, Natick, MA (US); Brian Ulicny, Winchester, MA (US); Gray Watson, Lexington, MA (US); Steven Quince, Tyngsboro, MA (US); Alden Dorosario, South Grafton, MA (US); Vladimir Zelevinsky, Brookline, MA (US); Stavros Michael MacRakis, Cambridge, MA (US)

(73) Assignee: Lycos, Inc., Waltham, MA (US)

( * ) Notice: Subject to any disclaimer, the term of this patent is extended or adjusted under 35 U.S.C. 154(b) by 0 days.

(21) Appl. No.: 11/220,394

(22) Filed: Aug. 31, 2005

(65) Prior Publication Data
US 2007/0050353 A1 Mar. 1, 2007

(51) Int. Cl.
*G06F 7/00* (2006.01)
*G06F 17/00* (2006.01)
(52) U.S. Cl. .................... 707/5; 707/102; 715/223
(58) Field of Classification Search .......... 707/1–10, 707/100–104.1, 200–206; 715/206–208, 715/223, 234, 255, 256, 268, 780
See application file for complete search history.

(56) References Cited
U.S. PATENT DOCUMENTS 6,012,053 A * 1/2000 Pant et al. ................... 707/3
6,026,391 A * 2/2000 Osborn et al. ............... 707/2
6,732,088 B1 * 5/2004 Glance ........................ 707/3
2002/0103798 A1 * 8/2002 Abrol et al. ................. 707/5
2004/0015783 A1 * 1/2004 Lennon et al. ............ 715/523
2004/0215608 A1 * 10/2004 Gourlay ..................... 707/3

OTHER PUBLICATIONS

Glover et al., Improving category specific web search by learning query modifications, 2001, IEEE, 23-31.*
Lam et al., Querying Web data—the WebQA approach, Dec. 12-14, 2002, IEEE, 139-148.*
Jeonghee et al., Metadata based Web mining for relevance, Sep. 18-20, 2000, IEEE, 113-121.*
International Search Report for Application No. PCT/US06/31468, Aug. 31, 2005.
Written Opinion for Application No. PCT/US06/31468, Aug. 31, 2005.
Glover, et al., "Improving Category Specific Websearch by Learning Query Modifications", 2001 IEEE, pp. 23-31.

* cited by examiner

*Primary Examiner*—Jean B Fleurantin
(74) *Attorney, Agent, or Firm*—Fish & Richardson P.C.

(57) ABSTRACT

A method of generating a report from multiple sources includes obtaining a topic based on input queries relating to the topic, obtaining information about the topic from the multiple sources, where the information includes excerpts from the multiple sources that meet one or more criteria, and generating the report using the excerpts. Generating the report includes obtaining subtopics for the excerpts, organizing the excerpts based on the subtopics, and editing text in the excerpts.

30 Claims, 4 Drawing Sheets

INFORMATION SYNTHESIS ENGINE

TECHNICAL FIELD

This patent application relates generally to computerized information retrieval, and more particularly, to a system that generates reports on topics by extracting excerpts from multiple sources and arranging the excerpts into a structure.

BACKGROUND

Traditional search engines operate as follows. A user inputs a search query into the search engine. The search query may include a number of search terms, perhaps issued in conjunction with Boolean search operators. In response to the search query, the search engine returns a ranked list of document titles, along with their uniform resource locators (URLs) and snippets indicative of each document's content or relation to the search query. The document titles are typically hyperlinked to the source documents.

Information about the hyperlinked documents is typically presented in order of descending relevance and, in more recent search engines, document merit, where document merit is calculated independently of the search query that resulted in identification of the documents. It is up to a user to scan the search results to determine which documents are worth retrieving entirely in order to obtain desired information.

Some search engines, referred to herein as "answer engines", return short answers to queries that express a question (e.g., "What is the capital of Sweden?") or are implicitly related to such a question ("capital of Sweden") instead of, or in addition to, returning a ranked list of documents. This short-answer functionality may use special authoritative sources, such as encyclopedias or almanacs, from which the answers are derived.

SUMMARY

This patent application describes apparatus and methods, including computer program products, for implementing an information synthesis engine that generates reports comprised of excerpts from multiple sources.

In general, in one aspect, the invention is directed to generating a report from multiple sources, and includes obtaining a topic based on input queries relating to the topic, obtaining information about the topic from the multiple sources, where the information comprises excerpts from the multiple sources that meet one or more criteria, and generating the report using the excerpts. Generating the report includes obtaining subtopics for the excerpts, organizing the excerpts based on the subtopics, and editing text in the excerpts. The multiple sources may include Web sites and the report may be in the form of a Web page. This aspect may also include one or more of the following features.

Subtopics for the excerpts may be obtained by identifying noun phrases in the excerpts and categorizing the noun phrases in subtopics. The topic may be obtained by receiving the input queries over a period of time, and identifying input queries received over the period of time that are directed to the topic. Topic identification may take into account one or more of: text in the input queries, a frequency of the input queries, and origination points of the input queries.

Information about the topic may be obtained by assigning the topic to one or more categories, and determining whether the topic is ambiguous based on the one or more categories to which the topic is assigned. The topic may or may not be ambiguous if the topic is assigned to more than one category. If the topic is determined to be ambiguous, the following actions may be performed: disambiguating the topic by combining elements of the one or more categories with the topic, thereby producing a disambiguated topic, and formulating a search query based on the disambiguated topic. If the topic is determined not to be ambiguous, the search query may be formulated based on the topic. Multiple sources may be searched using the search query, and search results received as a result of searching the multiple sources. The search results may include documents corresponding to the search query. The excerpts may be extracted from a subset of the documents.

The subset of the documents from which to extract the excerpts may be selected based on intrinsic metrics and extrinsic metrics. The intrinsic metrics may include data from the documents and the extrinsic metrics may include data relating to the documents but not from the documents. The excerpts may be extracted from the subset of documents based on the one or more criteria, where the excerpts may include text and non-text.

The extrinsic metrics may include one or more of: popularity of Web sites containing the documents, hyperlinks relating to the documents, circulation figures for publications relating to the documents, presence or absence of such Web sites on a manually produced list of favored or disfavored sites, and length of operation of Web sites containing the documents. The intrinsic metrics may include presence or absence of one or more of the following in the documents: copyright notices, telephone numbers, shopping carts, misspellings, offensive language, and obscene language. The criteria may include one or more of: a discourse topic of the excerpt, grammaticality of the excerpt, a number of sentences comprising the excerpt, and a number of times words relating to the search query are repeated in the excerpt.

The text may be edited by deleting words from a sentence based on at least one of a location of the words in the sentence and a location of the sentence in the excerpt, and adding words to a sentence based on a location of the sentence in the excerpt.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different figures indicate like elements.

DETAILED DESCRIPTION

Described herein is an information synthesis engine that automatically generates a multi-paragraph, (potentially) multi-page, report on a topic by extracting excerpts, including paragraph-like text and images, from existing Web pages and arranging the extracted excerpts into an organized structure.

The information synthesis engine thus generates a search result that is akin to the first draft of an encyclopedia article on a topic. The report identifies the source(s) of the excerpts, and forms a relatively coherent narrative on the topic.

The report generated by the information synthesis engine differs from the arrangement of snippets on traditional search engine pages in that paragraphs are not necessarily ordered with respect to a relevance metric of the source documents. That is, a page that is not particularly relevant to the topic as a whole, and which would not rank highly in a search engine, may contain a single paragraph that is ideal for the lead paragraph of the report. Moreover, the snippets on search engine result pages are not selected in order to form a coherent report on a topic, but only to give some indication of how their source page relates to the query.

The information synthesis engine differs from answer engines in that it does not output only a short paragraph-length (or shorter) answer to a question, such as "Who is Jane Doe?" (for the purposes of this application, "Jane Doe" is a fictitious actress/singer), but instead produces a relatively comprehensive report on the actress and singer's life and career, which may be broken into subtopics that may contain multiple paragraphs and non-text, such as images or multimedia items.

In one implementation, the information synthesis engine is comprised of a number of software modules including, but not limited to, modules for obtaining topics about which to create reports; modules for scouring the Internet, including Web pages, for excerpts, out of which a report is constructed; and modules for organizing the excerpts into a relatively coherent and logical report. In this implementation, the excerpts can be individual paragraphs or portions of paragraphs; however, the invention is not limited as such. In other implementations, the excerpts may be individual sentences, portions of sentences, multiple paragraphs, or whole pages. Although the information synthesis engine is described here in the context of the Internet, the information synthesis engine is not limited to use in an Internet context, but rather may be used to obtain excerpts from any databases, and to generate reports using those excerpts.

Figure 1:
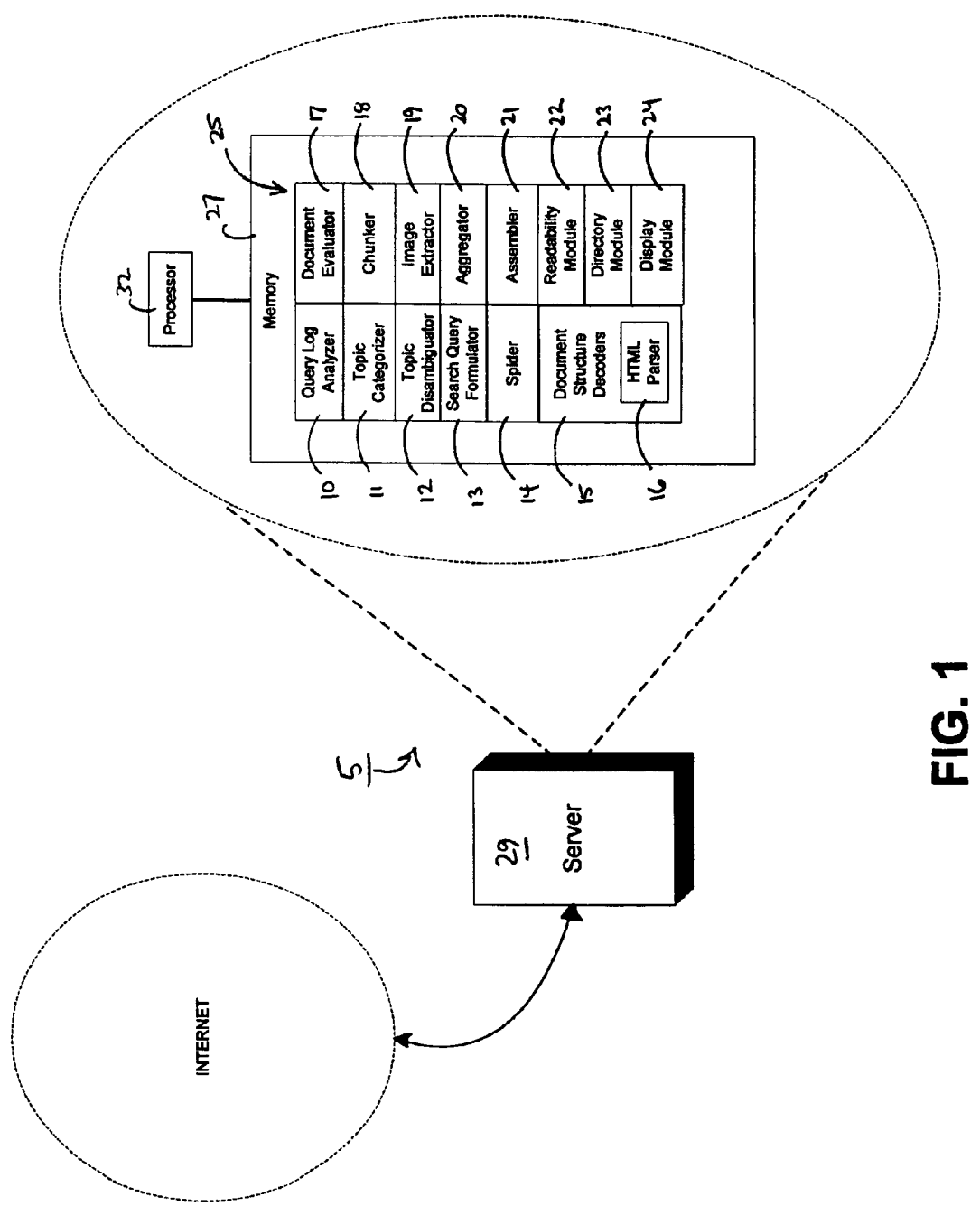
FIG. 1 is a block diagram of a computer system that may be used to implement the information synthesis engine and corresponding processes described herein.

FIG. 1 shows a computer system 5 containing modules 10 to 24 that make up information synthesis engine 25. These modules may be stored, e.g., in memory 27 on, or associated with, a server 29 that is in communication with the Internet 30. Although only one server 29 is shown in FIG. 1, in actuality, server 29 may be numerous servers, e.g., a server farm, having hierarchical relationships for implementing various functions. Information synthesis engine 25 is executed by one or more processors, labeled processor 32, to perform the functions described herein. The functions include generating reports comprised of excerpts from various documents, and providing those reports in response to inputs from a user accessing the server, e.g., via a URL. Descriptions follow of modules 10 to 24 that make up information synthesis engine 25.

The query log analyzer 10 obtains a topic, upon which a report is to be generated. In this implementation, the topic is obtained based on user-input queries, which may be obtained, e.g., from query log(s). In other implementations, however, topics may be obtained in other ways including, but not limited to, individual suggestions, mining news articles for frequent topics, and back-of-the-book indices.

As noted, in this implementation, the queries may be obtained from query log(s), which contain queries received from users over a period of time. The query log analyzer makes its determination using queries received within a predefined period of time (e.g., two months), and ignores queries not received within that time period. In this implementation, the queries may include one or more keywords relating to a particular topic, along with operands, such as "and" and "or", that link the keywords.

The query log analyzer retrieves, from query log(s), queries received within the predefined period of time. The query log analyzer normalizes the queries. For example, the query log analyzer disregards queries that may have been generated automatically, e.g., through scripts running on a user's computer, by identifying multiple same queries that originated from a single user. The query log analyzer also identifies variant queries, meaning queries that include different words or combinations of words that have identical or similar, meanings. For example, queries containing singular and plural nouns are judged to constitute the same query, such as queries for "gutter" and "gutters". Also, queries that have the same, or similar, words in different order are also judged to constitute the same query, such as queries for "wool sweater" and "sweater wool".

The query log analyzer obtains a count of each of the normalized queries, and ranks the normalized queries in terms of popularity. The popularity of a normalized query may correspond to its count over the entire predefined time period, e.g., two months, or over a portion of that time period. Queries that are more recent in time may be weighted higher when determining their popularity in order to reflect a recent trend or news event. The normalized queries that are ranked higher in terms of popularity may be processed to generate the reports described herein. In this implementation, the normalized queries constitute topics upon which reports are to be generated.

The topic categorizer 11 obtains a normalized query, i.e., a topic, from the query log analyzer, and assigns the topic to a category. In this implementation, the topic is assigned using the Open Directory Project categories, known as the DMOZ—"Directory Mozilla"—hierarchy. Other categorization schemes may be used instead of, or in addition to, the DMOZ hierarchy. Briefly, the DMOZ hierarchy includes a tree-based taxonomy of Web sites that are organized by category names, referred to herein as DMOZ category names.

The topic categorizer may edit the DMOZ category name in various ways, e.g., for length and appropriateness. DMOZ categories that relate to the age-appropriateness of a page may be modified, for example. The topic categorizer uses supervised machine-learning techniques to match a topic to one or more DMOZ-based category names.

For topics that are too recent to have a corresponding name entry in the DMOZ hierarchy, the topic categorizer may use text mining techniques to locate hyponym terms, i.e., broader terms, from the DMOZ hierarchy that can be used to categorize the topic. For example, if the television boxing show "The Contender" does not have a place in the DMOZ hierarchy, the topic categorizer may use text mining techniques to discover that "reality show" is a hyponym of "The Contender" by searching for text patterns, such as "The Contender and other <plural NP>", or "<plural NP> such as The Contender". Terms that instantiate the "plural NP" in this pattern are likely hyponyms for "The Contender", and can be used to locate a category for "The Contender" in the DMOZ hierarchy. Other processes for obtaining hyponyms may be used in addition to, or instead of, the process described herein that uses the DMOZ hierarchy.

The topic disambiguator 12 determines whether a topic is ambiguous by examining category/ies to which the topic is assigned by the topic categorizer. A topic may be ambiguous if the topic is assigned to two or more DMOZ-based categories. For example, the topic "Saturn" may refer to a planet, an automobile manufacturer, or a Roman god. In this context, belonging to multiple categories is necessary, but not sufficient, for a topic to be deemed ambiguous. The disambiguator implements a function that decides, given a query/topic and a set of categories, whether a particular topic ambiguous, e.g., does the topic refer to more than one thing. In this regard, certain families of categories are inherently incompatible. For example, it is not possible to be both a sports team (Rockets) and a piece of technology (rocket), or to be both a car (Saturn) and a planet (Saturn). This implementation uses various heuristics for determining what families of categories in the DMOZ hierarchy are incompatible. A machine learning process may also be used to fine tune the disambiguator. For example, currently-implemented heuristics would state that no one person could be both an actress and an inventor. So if the topic "Hedy Lamarr" was assigned these categories, the topic disambiguator would assume that this name was ambiguous in that it could refer to an actress and a distinct person who was an inventor. In actuality, however, Lamarr was a single person who was both an actress and an inventor of spread-spectrum telecommunications.

In the above example, the topic disambiguator would not find a common category; therefore, it would deem the two topics called "Saturn" separate topics and create a disambiguator for each sense, e.g., Saturn (planet) and Saturn (automobile). Topics that pass through the topic disambiguator are referred to herein as disambiguated topics.

The search query formulator 13 receives a disambiguated topic from the topic disambiguator and, for the disambiguated topic, formulates a search query designed to return content that may be used to construct a report on that topic. For example, the search query formulator may modify and/or augment the original topic name based on how the topic was disambiguated. That is, the search query formulator determines a search query for each meaning of a topic, where necessary. In the examples used above, the search query formulator determines two separate search queries for "Saturn" to reflect that "Saturn" can refer to a planet or an automobile. Separate search queries would not be necessary, however, for "Jane Doe" because both occurrences of "Jane Doe" (i.e., actress and singer) refer to the same person. That is, "Jane Doe" is not ambiguous. The search query may be a composite of the topic and one or more categories of the DMOZ hierarchy. For example, disambiguated queries for "Saturn" might be ""+Saturn planet–automobile" (for Saturn the planet) and "+Saturn automobile–planet" (for Saturn the car).

Additional terms may be added to search queries in order to differentiate them further or to attempt to obtain more specific search results. For example, if a topic is known to be the name of a movie star, then additional terms, which are likely to evoke useful search results, may be added to the search query. The additional terms may be obtained from the DMOZ hierarchy or from other source(s), such as a thesaurus. When adding synonyms, care should be taken to formulate the search query correctly, so that not all synonyms are present in a document. That is, if the query is "red sweater" and "red" is synonymous with "crimson" and "ruby", then a query such as "sweater and (red OR crimson OR ruby)" may be appropriate, but "red crimson ruby sweater" may not.

It is also noted that more than one search query can be formulated to find relevant documents. Additionally, terms might be added to the search query that indicate that certain terms must be present in the URL (e.g. "insite:nytimes.com" means return content found on the New York Times® site). Terms might be added to specify that content should have been produced after or before certain dates or must be in English or some other language. In general, there are many features of Web document search that can be exploited by carefully formulating the search query to return relevant documents.

In the "Jane Doe" example, the additional search terms may direct the search (via spider 14, below) to favor documents that include words such as "co-star", "director", "script", "upcoming role" in addition to the name of the star, and to disfavor documents containing terms like "fan fiction" or documents coming from television listings sites (on the theory that such documents tend to contain uninteresting or inaccurate information). Similarly, search terms may be used that direct the search to disfavor documents relating to other meanings of the topic. For example, if a search query is being generated for Saturn the planet, the search query may specify terms, such as automobile, that should not be included in retrieved documents. Categories from the DMOZ hierarchy may be used to obtain such terms. In alternative implementations, the terms may be obtained from other databases or knowledge sources in addition to, or instead of, the DMOZ hierarchy.

The spider 14 receives the search query from the search query formulator and uses the search query to search for documents—in this example, Web pages—containing content that corresponds to the search query. Documents identified as a result of the search may be ranked in terms of relevance, as is done in types of search engines. As with other spider applications, the spider should take care not to download content that a Web site has marked as not to be downloaded. Furthermore, the spider should keep track of how frequently it is requesting content from a same Web site so as not to risk being barred from the site for downloading content too aggressively. Downloaded documents, or portions thereof, may be stored in a cache for further processing. The downloaded documents, or portions thereof, are referred to herein as "cached documents".

Document structure decoders 15 unpack the structure of cached documents to generate a textual structure for the cached documents. This textual structure can be processed further in order to extract topic-relevant excerpts and other information. One example of a document structure decoder is the hypertext markup language (HTML) parser.

The HTML parser 16 retrieves a cached document, distinguishes HTML source elements (e.g., tags) from content such as text and images, and separates the HTML source elements from the content in a way that facilitates processing of the content, in particular, linguistic processing of text. More specifically, the HTML processor analyzes HTML tags in the document and organizes content delineated by those HTML tags into sections of contiguous text and/or images. For example, an HTML document may include a paragraph that contains various HTML source elements, but which represents a contiguous piece of text. In this case, the HTML parser identifies the paragraph from one or more HTML source elements and removes the HTML source elements, leaving a block of text.

In addition to the HTML parser, other document structure decoders may be used to identify excerpts in cached documents having different formats. For example, document structure decoders may be provided to process portable document format (PDF) files, Microsoft® Word® files, and the like. These other types of document structure decoders may operate in a manner similar to the HTML parser, e.g., identify contiguous sections of text and images based on formatting embedded in the document, and remove the formatting, where appropriate. Certain tags may be left in the document to identify the contiguous sections or, alternatively, new formatting structures may be added to the document to identify contiguous sections. Document structure decoders may also remove other document elements that are deemed unnecessary for producing a topical report. For example, browser-side processing instructions encoded in Javascript® may be removed.

Document evaluator 17 considers a cached document, e.g., Web page, as a whole to determine whether the document is to be used in generating the report. The document evaluator uses intrinsic and extrinsic metrics to make its determination. Examples of extrinsic metrics include, but are not limited to, the popularity of a Web site from which the document was obtained, incoming/outgoing links to/from a Web page or Web site containing the document, circulation figures for related print publications, length of operation of a Web site containing the document, presence or absence in a list of known good or known bad sites in a category, and copyright ownership of the document (a copyright notice itself may be considered an intrinsic metric). In one implementation, a document from a popular or long-standing Web site is more likely to be used, whereas a document containing links to unsavory (e.g., pornographic) sites is less likely to be used. Copyright ownership (as evidenced, e.g., by a copyright notice) is considered to be a sign of quality. So, Web pages with copyright notices are more likely to be used. Examples of intrinsic metrics include, but are not limited to, the presence or absence of one or more of the following features in excerpts of a document: telephone numbers, features or terms such as "shopping cart", misspellings, offensive language, and obscene language. For example, the more prevalent these features are in a document, the less likely the document will be used in generating the report. For telephone numbers, non-toll-free phone numbers are considered negative because they usually indicate pages of strictly local interest.

The document evaluator generates information for the cached documents based on the metrics noted above. This information may be used to affect the likelihood that excerpts from the document will be used in the report, and is associated (e.g., stored) with the document and/or with excerpts contained in the document. Generally speaking, the overall quality of a document is one factor in determining whether an excerpt from that document is used in generating the report. The document evaluator also identifies any page-level temporal or location-specific expressions that can be useful to anchor an excerpt in time or space. This information may also be associated (e.g., stored) with the document and/or with individual excerpts contained in the document. For example, it is possible to identify when a document is written and, using this information, favor more recent news over older news about a particular topic.

The chunker 18 identifies textual excerpts in the cached documents that include the topic obtained by the topic categorizer. The chunker does this only for documents that are deemed usable (e.g., relevant) by the document evaluator. This determination is made based on the information stored with the documents, or excerpts thereof, that was generated by the document evaluator. The chunker identifies textual excerpts in cached documents by identifying a topic sentence or discourse topic of an excerpt, e.g., through syntactic analysis. A discourse topic is the overall subject of a paragraph. In English, topics are frequently expressed as subjects, but there are ways to make other elements of a sentence the topic. For example, the sentence "Sports, Mary knows nothing about" has "sports" as its topic, even though "Mary" is the grammatical subject of the sentence. In one implementation, the chunker uses various heuristics to identify the discourse subject of a passage, relying, for example, on the fact that the subject of an initial non-topic sentence of a paragraph is likely to express the discourse topic. The subject may be identified by recognizing a noun phrase (e.g., one or more nouns) in the excerpt through linguistic analysis. Such analysis may include identifying multi-word units in a sentence, assigning a part of speech to each term, determining which of the words are noun phrases (one or more nouns) and identifying the subject based on this information and the position of the noun phrase(s) relative to that of a term (or terms) determined to be a verb.

It is noted that discourse topics can sometimes appear in non-subject positions. One example of this is the sentence "There are several things about Jane Doe you may not know". Furthermore, the discourse topic may be represented by an inflectional variant, e.g., broadcast/broadcasts/broadcasting, or an acronym or abbreviation, e.g., "National Hockey League®"/NHL®, or a pronominal reference. Various techniques for performing linguistic and semantic processing may be applied to identify that the discourse topics in an excerpt is the same as a the desired topic, taking into account the topic category as well.

Attributes may also be assigned to each excerpt describing the type of verb(s) associated with the topic(s), the tense (past, present, future) and aspect (progressive, perfect, imperfect, etc) of the verb(s), and the voice (passive, active, middle) of the verb(s). Other attributes denote noun phrases and proper nouns and their frequency within the excerpt, word counts, sentence counts, and other intrinsic properties of the excerpt.

The chunker compares the discourse topic of each excerpt to the topic obtained by the topic categorizer. If the two are determined to be co-referential, then the excerpt is deemed relevant to the topic. The chunker extracts excerpts that are identified as being relevant, and stores those excerpts for potential inclusion in the final report. Alternatively, the chunker may store references, such as pointers, to the excerpts or to documents with the excerpts.

Other criteria also may affect the relevance of an excerpt. Examples of other criteria that may affect the relevance of an excerpt include, but are not limited to, grammaticality of the excerpt, the number of sentences in the excerpt and the number of times words are repeated, and a number of times words relating to the search query are repeated in the excerpt. For example, grammatically correct excerpts are more likely to be useful; excerpts with a large number of sentences may be more likely to be relevant; and excerpts containing the search query or variants thereof a large number of times may be deemed spam and, therefore, be less likely to be relevant.

The image extractor 19 identifies relevant images (or multimedia files, such as digital film clips and/or audio clips) from a cached document, e.g., from their HTML tags, and associates such images with corresponding relevant excerpts. The image extractor may deem an image to be relevant if the topic provided by the topic categorizer (or some variation thereof) matches some portion of an "alt-text" of the image or multimedia) or if the topic matches some portion of a file name associated with the image. The image extractor may also deem an image relevant if a relevant excerpt references the image (e.g., "As can be clearly seen in FIG. 2, . . . "). Finally, the image extractor may deem an image relevant if it is embedded within a relevant passage or adjacent to it. The image extractor resolves relative URL paths to images to absolute paths. The extractor may download relevant images from the absolute paths, and store the images as thumbnails in association with corresponding excerpts. For example, the extractor may store pointers between corresponding images and excerpts. Functions of extractor 19 also apply to multimedia.

The aggregator 20 identifies the relevant excerpts, including text and images, and associates subtopics with the excerpts. The subtopics may be used as headers in the report. In this implementation, the aggregator selects subtopics for the relevant excerpts based on the frequency and properties of noun phrases and proper nouns in the excerpts. The subtopics may be obtained by matching these noun phrases and proper nouns to topics from the DMOZ hierarchy or variations thereof. The aggregator may filter subtopics in order to eliminate subtopics that occur too infrequently or too frequently or that are variants of the topic itself. Likewise, subtopics that are deemed similar may be merged into a single subtopic using a thesaurus or other knowledge source.

The assembler 21 retrieves relevant excerpts, and assigns the excerpts to one of the subtopics or, alternatively, to a topic overview. The topic overview provides an introduction to the topic as a whole. The assembler orders excerpts in the topic overview in a sequence that provides a relatively coherent narrative flow. This is done using a process that takes into account the way in which the topic is expressed (full mention, partial mention, pronominal reference), the type of verb and its tense/aspect/voice, the length of the excerpt, temporal and location information, and other criteria identified by the chunker and other modules. The assembler also identifies an introductory excerpt for each subtopic. The introductory excerpt introduces the relationship of the topic to that subtopic.

The assembler orders the remaining excerpts on the basis of rules prioritizing excerpts with certain attributes. In one implementation, the assembler orders excerpts using machine learning techniques to deduce ordering strategies from existing examples of expository text whose paragraphs have been marked with relevant information, either by human effort or by an automatic process. For example, the assembler may begin using an excerpt that is definitional. A definitional excerpt may include a noun phrase corresponding to a topic or a subtopic, followed by the verb "is" (or a variant thereof). For example, the assembler may start a paragraph of the report with an excerpt, such as "Saturn is a planet". Similar excerpts may follow, such as "Saturn is the sixth planet from the Sun" and "Saturn is a gas giant planet". Then, the assembler may incorporate excerpts indicating properties of Saturn. Such excerpts may include noun phrase(s) followed by the verb "has" (or a variant thereof). Such a sentence might be "Saturn has nineteen moons" or "Saturn has a system of rings". Thereafter, more unique excerpts may be incorporated, such as "The Cassini spacecraft recently visited Saturn". Generally speaking, at this point, the assembler prefers sentences that have unique noun phrases and which are relatively long, on the theory that such sentences will have more interesting information, relatively speaking, about the topic.

The assembler also inserts, into the report, hyperlinks to subtopics, which allow a user to navigate to sections of the report dealing with that subtopic. If an excerpt has an associated image (or multimedia file), an HTML tag encoding the necessary attributes for displaying the thumbnailed version of the associated image (or multimedia file) is incorporated into the excerpt, and thus, the report. "Alt-text" is also provided for the thumbnailed image. The assembler may also add, to the report, links to other reports, such as reports on topics that are mentioned in the current report and on topics that fall within the same category as the current report. For example, a report on Saturn the planet may contain links to reports on other planets.

The assembler also provides a source name for the URL from which an excerpt was extracted by using the source URL to look up the site's owner and/or associated author information. The source name may be used as a header in the report or simply to indicate a source of information. For example, information from a URL beginning http://www.cnn.com . . . would be attributed to "CNN® News". The assembler may use an existing service, such as the Alexa® service, to map the URL to the parent company or site (or subdomain) owner. In other cases, for example, a URL beginning http://atrios.blogspot.com . . . would be attributed to "Eschaton Blog", not to Blogspot.com or its owners. Information concerning the source name, the source URL, and the source URL title may be encoded within HTML for excerpts for display.

A readability module 22 performs minor editing on the report to enhance its readability. For example, the readability module may discard discourse markers that do not make sense for an excerpt out of its original context (e.g. "In conclusion, . . . " or "Thus, . . . "), and clarify referents (e.g. transforming "the actress said" to "[Jane Doe] said"). The readability module may employ one or more standard linguistic processing techniques to implement such editorial revisions. This module also normalizes text formatting, makes any needed changes to punctuation or capitalization, inserts editorial ellipses to indicate that text has been removed, and the like. This module may employ standard conventions to convey editorial revisions of quoted materials.

A directory module 23 takes the output of the topic categorizer and constructs a directory of topics for use by human users, Web spiders, and robots to traverse the directory structure. Directory pages are constructed from this structure to show the available generated reports within a certain topic area (e.g. Astronomy or Cooking or Movies). Popular or recently updated topics can be featured on such pages.

A display module 24 obtains report data assembled by the assembler in extensible markup language (XML) format, and constructs valid HTML for use rendering a report in a Web browser. This resulting report is displayed is displayed in the browser.

Figure 2:
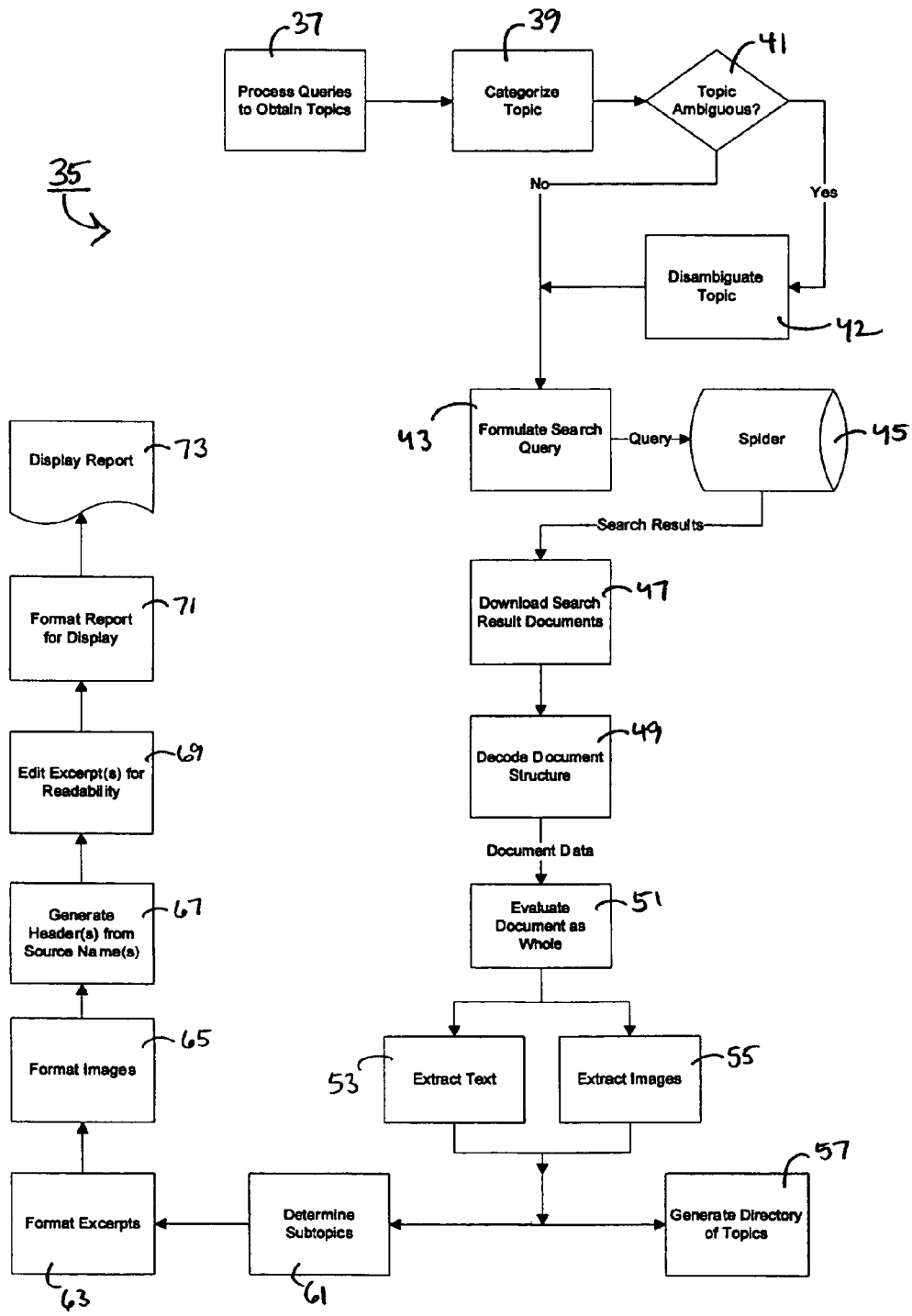
FIG. 2 is a flowchart showing a process performed to implement the information synthesis engine described herein and thereby generate a report containing excerpts from multiple sources.

FIG. 2 is a flowchart showing a process 35 that is performed by information synthesis engine 25 to generate a report. Detailed explanations of the modules that implement process 35 are provided above. Short synopses of the modules' operation are provided below, where necessary, to describe the program flow of process 35.

In process 35, query log analyzer 10 obtains search queries from query log(s) or other sources, and processes (37) the search queries to obtain a report topic. The processing performed by query log analyzer 10 is described above, including normalizing the queries, merging the queries, etc. Topic categorizer 11 categorizes (39) the topic using, e.g., the DMOZ hierarchy, a variation thereof, or any other suitable categorization scheme. Topic disambiguator 12 determines (41) whether the topic is ambiguous, as described above. If topic disambiguator 12 determines (41) that the topic is ambiguous, topic disambiguator 12 determines, and stores, one or more meanings of the topic. No action is necessary if topic disambiguator 12 determines (41) that the topic is not ambiguous.

Search query formulator 13 formulates (43) a search query for the topic. As described above, the search query may include a name of the topic and one or more additional words that further define the topic. Spider 14 searches (45) the Internet and/or any other databases in order to obtain search results that correspond to the search query formulated by search query formulator 13. Spider 14 downloads (47) the search results to server 29, and stores the search results in a cache or other storage area. As described above, the search results may be Web pages or other documents containing word(s) from the search query. The search results may be obtained from multiple sources, e.g., Web sites or the like.

Document structure decoders, such as HTML parser 16, decode (49) the structure of documents that make up the search results. This includes separating document content, such as image and text, from formatting information, such as tags and the like, as described above. Document evaluator 17 evaluates (51) decoded documents as a whole, meaning that document evaluator determines the relevance of a particular document, and adds information to the document that is indicative of its relevance. Chunker 18 extracts (53) text from documents having at least a predefined relevance; and image extractor 19 extracts (55) images and other multimedia files from such documents. Operation of these modules is described above.

Directory module 23 generates (57) a directory of topics, including text obtained by chunker 18, thereby enabling navigation to related topics from a page. Directory module 23 also produces a full-text index of the contents of generated topical reports so that topic pages can be identified by the text of the excerpts included in such pages. The directory is made accessible through the final report. Aggregator 20 identifies relevant excerpts, including text and images, and determines (61) subtopics for those excerpts. Assembler 21 formats (63) text from the excerpts vis-à-vis the subtopics using, e.g., HTML; formats (65) and arranges the images vis-à-vis the text; and generates (67) headers and the like from URLs associated with excerpt source documents.

Readability module 22 performs (69) any necessary editing of the text in the formatted report. Display module 24 retrieves code for the report, and formats (71) and displays (73) the report in a browser window.

Figure 3:
FIGS. 3 and 4 are examples of reports generated by the information synthesis engine.
Figure 4:

FIGS. 3 and 4 are examples of reports generated by information synthesis engine 25 via process 35. The report of FIG. 3 is directed to "Santa Claus", who is the topic 75 of the report. Various subtopics relate to elves 76, Christmas eve 77, and Christmas songs 78. Text (e.g., 79, 80 and 81) follows the topic and each of the subtopics, and describes the associated topic or subtopic. Links, such as 82, 83 and 84, are provided to obtain information on the full article or articles from which the text was excerpted. As shown, an image 86 appears with text 79. Also included in the report is a section 88 labeled "Popular Topics", which provides links to reports related to other topics that were deemed popular.

The report of FIG. 3 also contains links 90 to reports on related topics, such as reindeer 91. Clicking on this link causes the report of FIG. 4 to be displayed. The report of FIG. 4 is directed to reindeer and, as shown by directory 92, is obtained by link from the report directed to Santa Claus (FIG. 3). The report of FIG. 4 contains many of the same features as the report of FIG. 3.

Reports on topics that are unrelated to Santa Claus, reindeer, or popular topics 88, may be obtained by entering keywords into field 95, and clicking on the "Go Get It" button.

All or part of process 35, and any modifications thereto described herein, (hereinafter, "the processes") can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions described herein. The actions can also be performed by, and the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the processes can be implemented in a computing system that includes a back-end component, e.g., as a data server, or that includes a middleware component, e.g., an application server, or that includes a front-end component, e.g., a client computer having a graphical user interface, or any combination of such back-end, middleware, or front-end components. The components of the system can be interconnected by any form or medium of digital data communication, e.g., a communication network. Examples of communication networks include a LAN and a WAN, e.g., the Internet.

Actions associated with the processes can be rearranged and/or one or more such actions can be omitted to achieve the same, or similar, results to those described herein.

Elements of different embodiments described herein may be combined to form other embodiments not specifically set forth above. Other embodiments not specifically described herein are also within the scope of the following claims.

What is claimed is:

1. A method, performed on one or more processing devices, for generating a report from multiple sources, the method comprising:
   obtaining a topic by processing input queries relating to the topic, the input queries corresponding to queries from multiple users made over a predefined period of time;
   obtaining information about the topic from the multiple sources, the information comprising excerpts from the search results that meet one or more criteria;
   wherein obtaining the information comprises:
      if the topic is ambiguous, disambiguating the topic by combining names of the one or more categories with the topic, thereby producing a disambiguated topic and formulating a search query based on the disambiguated topic;
      if the topic is not ambiguous, formulating the search query based on the topic; and
      searching the multiple sources using the search query to obtain the information; and
   generating the report using the excerpts, wherein generating comprises:

obtaining subtopics by analyzing the excerpts from the multiple sources for commonalities;

organizing the excerpts and hyperlinks associated with the excerpts under appropriate subtopics to provide a narrative flow relating to the topic, the excerpts being organized by subtopic and, in a subtopic, being organized in an order; and editing text in the excerpts, wherein editing comprises editing text in excerpts so that excerpts from different sources under subtopics read more like the excerpts from different sources came from a single source; and displaying the report.

2. The method of claim 1, wherein obtaining the topic comprises:

identifying input queries received over the period of time that are directed to the topic, wherein identifying takes into account one or more of: text comprising the input queries, a frequency of the input queries, and origination points of the input queries.

3. The method of claim 1, wherein obtaining information about the topic further comprises:

assigning the topic to one or more categories; and determining whether the topic is ambiguous based on the one or more categories to which the topic is assigned.

4. The method of claim 3, wherein the topic may be determined to be ambiguous if the topic is assigned to more than one category.

5. The method of claim 3, wherein obtaining information about the topic further comprises:

receiving search results as a result of searching the multiple sources, the search results comprising documents corresponding to the search query; and extracting the excerpts from a subset the documents.

6. The method of claim 5, wherein obtaining information about the topic further comprises:

selecting the subset of the documents from which to extract the excerpts, the subset of the documents being selected based on intrinsic metrics and extrinsic metrics, the intrinsic metrics comprising data from the documents and the extrinsic metrics comprising data relating to the documents but not from the documents;

wherein the excerpts are extracted from the subset of documents based on the one or more criteria, the excerpts comprising text and non-text.

7. The method of claim 6, wherein:

the extrinsic metrics comprise one or more of: popularity of Web sites containing the documents, hyperlinks relating to the documents, circulation figures for publications relating to the documents, and length of operation of Web sites containing the documents;

wherein the intrinsic metrics comprise presence or absence of one or more of the following in the documents: copyright notices, telephone numbers, shopping carts, misspellings, offensive language, and obscene language; and wherein the criteria comprise one or more of: a discourse topic of the excerpt, grammaticality of the excerpt, a number of sentences comprising the excerpt, and a number of times words relating to the search query are repeated in the excerpt.

8. The method of claim 1, wherein the multiple sources comprise Web sites and the report comprises a Web page.

9. The method of claim 1, wherein analyzing the excerpts the excerpts comprises:

identifying noun phrase in the excerpts; and categorizing the nouns phrases in subtopics.

10. The method of claim 1, wherein editing text comprises at least one of:

deleting words from a sentence based on at least one of a location of the words in the sentence and a location of the sentence in the excerpt; and adding words to a sentence based on a location of the sentence in the excerpt.

11. One or more machine-readable storage media containing instructions for use in generating a report from multiple sources, the one or more machine-readable storage media being one or more tangible media, the instructions being executable by one or more processing devices to:

obtain a topic by processing input queries relating to the topic, the input queries corresponding to queries from multiple users made over a predefined period of time;

obtain information about the topic from the multiple sources, the information comprising excerpts from the multiple sources that meet one or more criteria;

wherein obtaining the information comprises:

if the topic is ambiguous, disambiguating the topic by combining names of the one or more categories with the topic, thereby producing a disambiguated topic and formulating a search query based on the disambiguated topic;

if the topic is not ambiguous, formulating the search query based on the topic; and searching the multiple sources using the search query to obtain the information; and generate the report using the excerpts, wherein generating the report comprises:

obtaining subtopics by analyzing the excerpts from the multiple sources for commonalities;

organizing the excerpts and hyperlinks associated with the excerpts under appropriate subtopics to provide a narrative flow relating to the topic, the excerpts being organized by subtopic and, in a subtopic, being organized in an order; and editing text in the excerpts, wherein editing comprises editing text in excerpts so that excerpts from different sources under subtopics read more like the excerpts from different sources came from a single source; and display the report.

12. The one or more machine-readable storage media of claim 11, wherein obtaining the topic comprises:

identifying input queries received over the period of time that are directed to the topic, wherein identifying takes into account one or more of: text comprising the input queries, a frequency of the input queries, and origination points of the input queries.

13. The one or more machine-readable storage media of claim 11, wherein obtaining information about the topic further comprises:

(i) assigning the topic to one or more categories; and (ii) determining whether the topic is ambiguous based on the one or more categories to which the topic is assigned.

14. The one or more machine-readable storage media of claim 13, wherein the topic may be determined to be ambiguous if the topic is assigned to more than one category.

15. The one or more machine-readable storage media of claim 13, wherein obtaining information about the topic further comprises:

receiving search results as a result of searching the multiple sources, the search results comprising documents corresponding to the search query; and extracting the excerpts from a subset the documents.

16. The one or more machine-readable storage media of claim 15, wherein obtaining information about the topic further comprises:

selecting the subset of the documents from which to extract the excerpts, the subset of the documents being selected based on intrinsic metrics and extrinsic metrics, the intrinsic metrics comprising data from the documents and the extrinsic metrics comprising data relating to the documents but not from the documents;

wherein the excerpts are extracted from the subset of documents based on the one or more criteria, the excerpts comprising text and non-text.

17. The one or more machine-readable storage media of claim 16, wherein:

the extrinsic metrics comprise one or more of: popularity of Web sites containing the documents, hyperlinks relating to the documents, circulation figures for publications relating to the documents, presence or absence of the Web sites containing the documents in lists of known-good and known-bad sites, and length of operation of Web sites containing the documents;

wherein the intrinsic metrics comprise presence or absence of one or more of the following in the documents: copyright notices, telephone numbers, shopping carts, misspellings, offensive language, and obscene language; and wherein the criteria comprise one or more of: a discourse topic of the excerpt, grammaticality of the excerpt, a number of sentences comprising the excerpt, and a number of times words relating to the search query are repeated in the excerpt.

18. The one or more machine-readable storage media of claim 11, wherein the multiple sources comprise Web sites and the report comprises a Web page.

19. The one or more machine-readable storage media of claim 11, wherein analyzing the excerpts comprises:

identifying noun phrases in the excerpts; and
categorizing the noun phrases in subtopics.

20. The one or more machine-readable storage media of claim 11, wherein editing text comprises at least one of:

deleting words from a sentence based on at least one of a location of the words in the sentence and a location of the sentence in the excerpt; and adding words to a sentence based on a location of the sentence in the excerpt.

21. A method, performed on one or more processing devices, for generating a report from multiple sources, the method comprising:

(I) obtaining a topic based on input queries relating to the topic;

(II) obtaining information about the topic from the multiple sources, the information comprising excerpts from the multiple sources that meet one or more criteria; and (III) generating the report using the excerpts, wherein generating the report comprises:

(i) obtaining subtopics for the excerpts;
(ii) organizing the excerpts based on the subtopics; and
(iii) editing text in the excerpts;

(IV) wherein obtaining information about the topic comprises:

(i) assigning the topic to one or more categories;
(ii) determining whether the topic is ambiguous based on the one or more categories to which the topic is assigned;
(iii) wherein, if the topic is determined to be ambiguous, the method comprises:

disambiguating the topic by combining names of the one or more categories with the topic, thereby producing a disambiguated topic; and
formulating a search query based on the disambiguated topic;

(iv) wherein, if the topic is determined not to be ambiguous, the method comprises:
formulating the search query based on the topic;

(v) searching the multiple sources using the search query;

(vi) receiving search results as a result of searching the multiple sources, the search results comprising documents corresponding to the search query;

(vii) selecting a subset of the documents from which to extract the excerpts, the subset of the documents being selected based on intrinsic metrics and extrinsic metrics, the intrinsic metrics comprising data from the documents and the extrinsic metrics comprising data relating to the documents but not from the documents; and (viii) extracting the excerpts from the subset the documents, wherein the excerpts are extracted from the subset of documents based on the one or more criteria, the excerpts comprising text and non-text.

22. The method of claim 21, wherein:

the extrinsic metrics comprise one or more of: popularity of Web sites containing the documents, hyperlinks relating to the documents, circulation figures for publications relating to the documents, and length of operation of Web sites containing the documents;

wherein the intrinsic metrics comprise presence or absence of one or more of the following in the documents: copyright notices, telephone numbers, shopping carts, misspellings, offensive language, and obscene language; and wherein the criteria comprise one or more of: a discourse topic of the excerpt, grammaticality of the excerpt, a number of sentences comprising the excerpt, and a number of times words relating to the search query are repeated in the excerpt.

23. The method of claim 21, wherein the multiple sources comprise Web sites and the report comprises a Web page.

24. The method of claim 21, wherein obtaining subtopics for the excerpts comprises:

identifying noun phrase in the excerpts; and
categorizing the nouns phrases in subtopics.

25. The method of claim 21, wherein editing text comprises at least one of:

deleting words from a sentence based on at least one of a location of the words in the sentence and a location of the sentence in the excerpt; and
adding words to a sentence based on a location of the sentence in the excerpt.

26. One or more machine-readable storage media containing instructions for use in generating a report from multiple sources, the one or more machine-readable storage media being one or more tangible media, the instructions being executable by one or more processing devices to:

(I) obtain a topic based on input queries relating to the topic;

(II) obtain information about the topic from the multiple sources, the information comprising excerpts from the multiple sources that meet one or more criteria; and (III) generate the report using the excerpts, wherein generating the report comprises:

(i) obtaining subtopics for the excerpts;
(ii) organizing the excerpts based on the subtopics; and (iii) editing text in the excerpts;
(IV) wherein obtaining information about the topic comprises:
  (i) assigning the topic to one or more categories;
  (ii) determining whether the topic is ambiguous based on the one or more categories to which the topic is assigned;
  (iii) wherein, if the topic is determined to be ambiguous, the method comprises:
    disambiguating the topic by combining names of the one or more categories with the topic, thereby producing a disambiguated topic; and
    formulating a search query based on the disambiguated topic;
  (iv) wherein, if the topic is determined not to be ambiguous, the method comprises:
    formulating the search query based on the topic;
  (v) searching the multiple sources using the search query;
  (vi) receiving search results as a result of searching the multiple sources, the search results comprising documents corresponding to the search query;
  (vii) selecting a subset of the documents from which to extract the excerpts, the subset of the documents being selected based on intrinsic metrics and extrinsic metrics, the intrinsic metrics comprising data from the documents and the extrinsic metrics comprising data relating to the documents but not from the documents; and
  (viii) extracting the excerpts from the subset the documents, wherein the excerpts are extracted from the subset of documents based on the one or more criteria, the excerpts comprising text and non-text.

27. The one or more machine-readable storage media of claim 26, wherein:
  the extrinsic metrics comprise one or more of: popularity of Web sites containing the documents, hyperlinks relating to the documents, circulation figures for publications relating to the documents, and length of operation of Web sites containing the documents;
  wherein the intrinsic metrics comprise presence or absence of one or more of the following in the documents: copyright notices, telephone numbers, shopping carts, misspellings, offensive language, and obscene language; and
  wherein the criteria comprise one or more of: a discourse topic of the excerpt, grammaticality of the excerpt, a number of sentences comprising the excerpt, and a number of times words relating to the search query are repeated in the excerpt.

28. The one or more machine-readable storage media of claim 26, wherein the multiple sources comprise Web sites and the report comprises a Web page.

29. The one or more machine-readable storage media of claim 26, wherein obtaining subtopics for the excerpts comprises:
  identifying noun phrase in the excerpts; and
  categorizing the nouns phrases in subtopics.

30. The one or more machine-readable storage media of claim 26, wherein editing text comprises at least one of:
  deleting words from a sentence based on at least one of a location of the words in the sentence and a location of the sentence in the excerpt; and
  adding words to a sentence based on a location of the sentence in the excerpt.

* * * * *

UNITED STATES PATENT AND TRADEMARK OFFICE
CERTIFICATE OF CORRECTION

PATENT NO. : 7,548,913 B2  Page 1 of 1
APPLICATION NO. : 11/220394
DATED : June 16, 2009
INVENTOR(S) : Christopher A. Ekberg It is certified that error appears in the above-identified patent and that said Letters Patent is hereby corrected as shown below:

In the Claims:

Column 13, Lines 64-65, Claim 9:
after "the excerpts", delete "the excerpts". (Second occurrence)

Column 13, Line 33, Claim 5:
delete "a subset the documents", and insert --a subset of the documents--, therefor.

Column 14, Line 67, Claim 15:
delete "a subset the documents", and insert --a subset of the documents--, therefor.

Signed and Sealed this
Fifth Day of August, 2014

Michelle K. Lee
*Deputy Director of the United States Patent and Trademark Office*